Patented Nov. 10, 1942

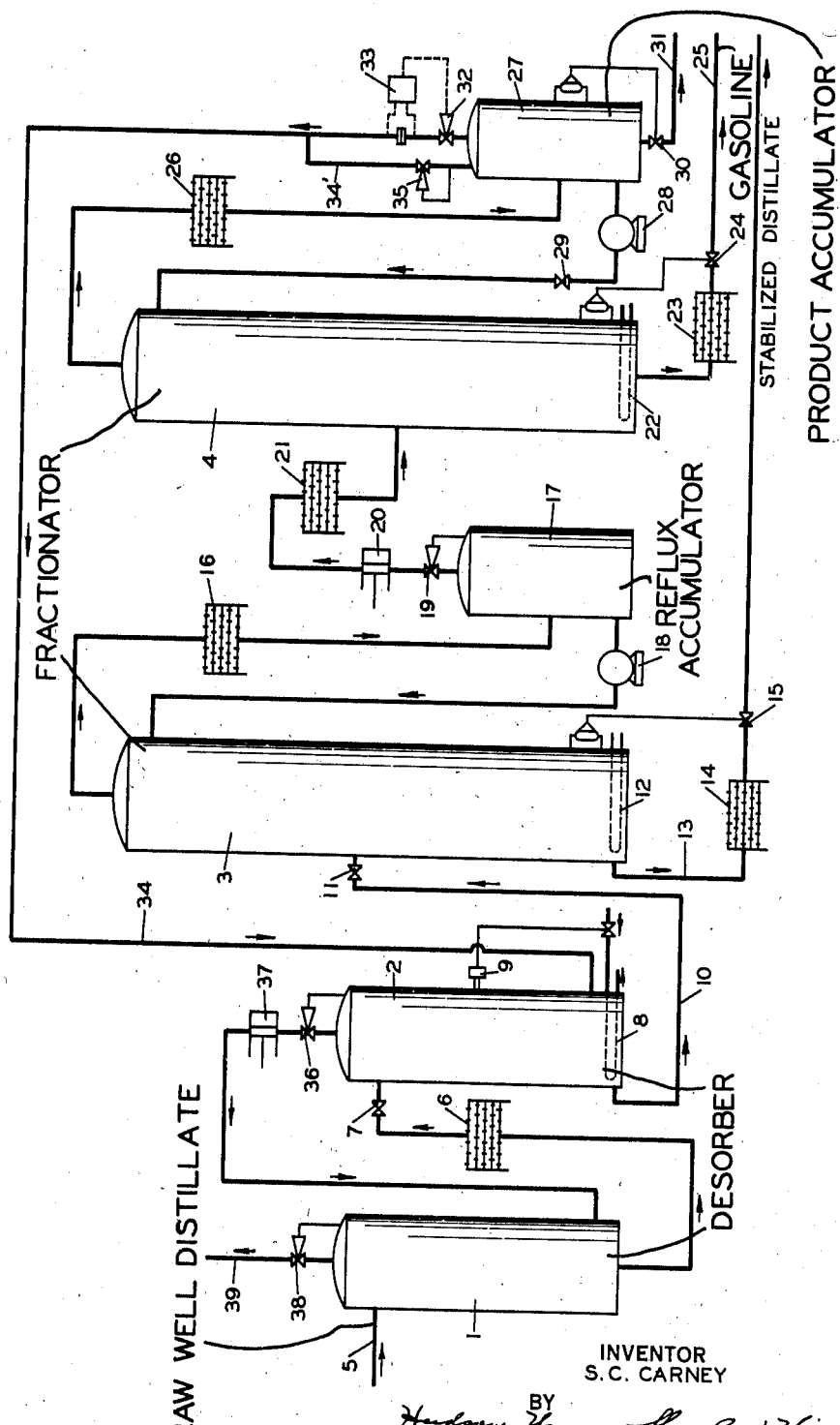

2,301,520

UNITED STATES PATENT OFFICE 2,301,520

TREATMENT OF HYDROCARBONS

Samuel C. Carney, Bartlesville, Okla., assignor to Phillips Petroleum Company, a corporation of Delaware Application June 11, 1940, Serial No. 339,987

6 Claims. (Cl. 196—11)

This invention relates to the separation of hydrocarbons. More particularly it relates to a method of rectification especially applicable to the separation of condensate from the so-called "distillate" type producing wells.

At the present time there is considerable production from high pressure gas wells found principally in the Gulf Coast region of Texas and Louisiana and known to the petroleum industry as "distillate" or "condensate" type wells. This type well produces gas and a light colored hydrocarbon liquid of relatively high A. P. I. gravity at a high gas-liquid ratio. Present practice in producing wells of the distillate type is to recover as much of the desirable components as possible as a liquid condensate and to return the residue gases to the producing formation through suitable input wells. This operation is known to the industry as recycling.

Distillate wells are being produced from formations having pressures ranging from 1000-3000 pounds per square inch, and it is reasonable to expect that even higher well pressures will be encountered as well depths increase. Condensation methods of liquid recovery involve cooling and reduction of pressure to the range of maximum recovery. Maximum recovery is obtained in present processes at pressures on the order of 600 to 900 pounds per square inch. Some recovery processes in operation at the present time are operated at pressures above those at which maximum recovery may be obtained to reduce the costs of recompression of the residue gases to the well injection pressure.

Even after recovery of the liquid condensate at high pressures, there still remains the problem of reducing the pressure on the liquid and the separation of the liquid into commercially desirable fractions. Such commercial fractions may be polymerization feed stock, natural gasoline, and a stabilized distillate. The manner in which the condensate is handled during the pressure reduction has considerable bearing on the nature and amount of the commercially desirable fractions that may be finally obtained. This is to a large extent due to the presence of volatile components in the liquid at high pressure which are vaporized from the liquid as the pressure is decreased. If the liquid recovered by the high pressure processes is reduced in one operation from the pressure at which it is recovered, e. g. 800 pounds per square inch absolute, to a moderate pressure, e. g. 45 pounds per square inch absolute, and the resulting gas and liquid separated there is a great loss of valuable components with the gas. The gas phase contains not only those components normally vaporized at 45 pounds per square inch absolute and the temperature prevailing, but also a considerable quantity of components which are normally liquids at this pressure and temperature. It has been found that if pressure on the liquid is reduced in steps with separation of the gas from the liquid after each pressure reduction, a larger quantity of the original liquid remains in the liquid phase at the final pressure (45 pounds per square inch absolute). This is the principle of "stage separation," well known and widely used in the petroleum industry.

The present invention provides an improved method for handling the liquid from the high pressure recovery plants during the pressure reduction, wherein methane and undesirable components may be removed from the condensate at high pressures and the remaining desirable components separated into commercially desirable fractions. Recovery of the desirable components by the method of this invention is increased over prior methods.

It is an object of this invention to provide an improved method of rectification.

Another object of this invention is to provide an improved method for the removal of undesirable lighter components from a fluid mixture.

A further object of this invention is to provide a method particularly adaptable to rectification of condensate from distillate type wells.

A still further object of this invention is to provide a method of rectification especially applicable to the separation of condensate from distillate type wells into commercially desirable fractions.

Other objects and advantages will be apparent from the following detailed description, and from the accompanying drawing.

The accompanying drawing is a diagrammatic elevation showing apparatus suitable for carrying out the method of this invention.

With reference to the drawing, the numerals 1 and 2 designate desorbers for the elimination of methane and other undesirable gases, in combination with rectifying equipment comprising fractionators 3 and 4. Desorbers 1 and 2 may be bubble plate or packed columns or other suitable countercurrent contacting devices, each having the equivalent of two or more "equilibrium plates." Liquid from the high pressure recovery plant, not shown in the drawing, enters at the top of the first desorber 1 through the pipe 5. Liquid from the base of the first desorber is passed through cooler 6, through a control valve 7, and to the top of the second desorber, 2. Desorber 2 is provided with a heating element 8 at its base which is controlled by a thermostat 9 located part way up the desorber. Liquid from the base of the second desorber is passed through pipe 10 in which it may or may not be cooled and through the pressure reducing control valve 11 into the fractionator 3. The fractionator is any suitable fractionating tower, preferably a plate type tower, with heating means 12 at its base. Liquid from the base of the fractionator, which comprises the least volatile components of the well fluid, is withdrawn through the pipe 13, passed through the cooler 14 and the float control valve 15 to stabilized distillate storage. Overhead vapors from the fractionator 3 are partially condensed in a condenser 16 and the mixed vapor and condensate delivered to a reflux accumulator 17. From the reflux condenser, all condensate is pumped to the top of the fractionator 3 as reflux by the reflux pump 18.

Uncondensed vapors from the reflux accumulator are withdrawn through a back pressure regulator 19 to a compressor 20 where they are compressed and passed to condenser 21 from which they are delivered as part liquid and part vapor to the fractionator 4. The fractionator 4 is similar to the fractionator 3, being so constructed as to give the desired degree of separation between a natural gasoline fraction withdrawn from its base and the remaining lighter components which are taken from the top of the fractionator. Heat to the fractionator is supplied through a suitable heating element 22 in the base of the fractionator. The natural gasoline fraction from the base of the fractionator 4 is cooled in a cooler 23 and passed to storage through a float controlled valve 24 and pipe 25. Overhead vapors from the top of the fractionator 4 are passed through a condenser 26 into a product accumulator 27. The pump 28 delivers reflux from the product accumulator, as controlled in the known manner by valve 29, to the top of the fractionator 4. Liquid from the product accumulator 27, not required as reflux, is withdrawn from the product accumulator through the float controlled valve 30 and the pipe 31.

Uncondensed vapors and gases from the product accumulator pass through the valve 32 of the rate-of-flow controller 33 and are introduced into the base of the second desorber 2, through pipe 34. A back pressure regulator 35 is provided in the pipe 34' which by-passes the rate of flow controller. Vapors supplied to the base of the desorber 2 are brought into intimate countercurrent contact with liquid entering the top of the desorber. Vapors and gases from the top of the desorber 2 pass through the back pressure regulator 36 to the compressor 37 where they are compressed to the higher pressure prevailing in the desorber 1 and introduced into the desorber 1 at its base. Vapors entering the base of desorber 1 are brought into intimate countercurrent contact with liquid entering the top of the desorber through pipe 5. Residual gases from the top of the desorber 1 pass through the back pressure regulator 38 and pipe 39 from which they may be sent to recompressors for recycling to the producing formation.

The first desorber 1 is operated at or near the pressure at which the condensate entering the system through pipe 5 is recovered. The back pressure regulator 38, controlling the pressure of first desorber, is set to maintain a pressure equal to the total vapor pressure of the "raw distillate" including its total content of dissolved methane. The pressure in the second desorber 2 as governed by the back pressre regulating valve 36, is maintained at a pressure equal to the vapor pressure of the methane-free liquid in the presence of desorbing vapor at the temperature prevailing at the base of the second desorber. The rectification system including the fractionators are operated as known in the art at such pressures and temperatures as to give the desired degree of separation of the demethanized liquid from the second desorber into commercially desirable fractions. The pressure of the fractionator 3 is maintained by back pressure regulator 19 at the top of the reflux accumulator 17. Fractionator 4 is operated at a pressure equal to the vapor pressure of the polymerization feed stock in the product accumulator 27. A stream of vapor from the top of the accumulator 27 is continuously released through the valve 32. The volume of this vapor, as controlled by the rate-of-flow controller 33, is the amount required for eliminating methane from the liquid at the base of the desorber 2. The back pressure regulating valve 35 is set to open at a maximum pressure, which is higher than the normal operating pressure. If, for any reason the quantity of vapor sent to the base of the second desorber is not sufficient to effect complete removal of methane, the methane will raise the pressure in the product accumulator 27, causing the regulator 35 to open, thereby increasing the quantity of vapor sent to the second desorber.

Latent heat and sensible heat of the gas supplied to the base of desorber 1 from the top of desorber 2 serves to raise the temperature at the base of the first desorber. The action of the gas on the liquid in the desorber is described in the applicant's co-pending application, Serial No. 227,395, filed August 29, 1938. It is to be noted that the liquid from desorber 1 is cooled in a cooler 6 before pressure reduction through the control valve 7. This cold stream of liquid and further cooling by evaporation of some of the liquid at the top of the desorber 2 reduces the temperature at the top of the second desorber. The increased temperature at the base of the first desorber, together with the desorbing action of the gas from the top of desorber 2, reduces the methane in solution, while the reduced temperature at the top of the second desorber 2 reduces the volume of flashed gases sent to compressor 37, thus increasing the percentage of methane in the gas handled by the compressor and reducing the load on the compressor by retaining components heavier than methane in the liquid phase. Heat supplied to the base of the desorber 2 by the heating element 8 is sufficient to give freedom from methane in the liquid withdrawn through pipe 10. Removal of methane may be accomplished without supplying heat by the heating element 8. If no heat is supplied by the heating element, a lower pressure must be maintained in the desorber 2 or a larger amount of vapors must be supplied to the base of the desorber, or a combination of the two must be used to insure freedom of methane. Reduction of pressure on the desorber increases the load on the compressor 37 while a larger vapor rate to the desorber increases the load on the compressor 20. Heat is supplied to the base of the desorber in such quantities as will give the lowest compressor loads consistent with good results.

In actual practice, the composition of the liquid entering pipe 5 will vary somewhat. It is desirable for good compressor operation that the pressures on the desorbers remain substantially constant. The pressure of the second desorber has been defined as the vapor pressure of the liquid at the base of the desorber. If the pressure of the second desorber is fixed at some reasonable value, then the temperature at the base of the desorber 2 may be varied as the composition of the liquid varies to maintain the vapor pressure constant. The temperature at the base of the desorber is dependent upon the heat supplied by the heating element which is controlled by a thermostat 9. The thermostat is set in the desorber column somewhat above the heating element 8 and is adjusted to maintain as small a rise in temperature above the temperature existing at the top of the desorber as the accuracy of the thermostat will allow. The slightly variable liquid at the base of the desorber will thus be maintained at its boiling point with a very small amount of evaporation.

Some of the advantages of the use of my invention will be apparent from an illustrative example. Condensate available at 800 pounds per square inch absolute is flashed to 250 pounds per square inch absolute, then to 50 pounds per square inch absolute, and finally to 15 pounds per square inch absolute in a typical stage separation process in use at the present time. All pressures given are pounds per square inch absolute and quantities are in mols.

|  | 800# liquid | 250# liquid | 50# liquid | 15# liquid |
|---|---|---|---|---|
| Methane | 1081 | 240 | 15 | 00.19 |
| Ethane | 965 | 622 | 219 | 19. |
| Propane | 719 | 620 | 421 | 106 |
| Butanes | 759 | 718 | 624 | 315 |
| Pentanes | 602 | 593 | 571 | 445 |
| Hexanes | 595 | 590 | 582 | 527 |
| Heptanes plus | 1971 | 1968 | 1968 | 1948 |
|  | 6692 | 5351 | 4400 | 3360 |

|  | 250# gas | 50# gas | 15# gas |
|---|---|---|---|
| Methane | 841 | 225 | 14.81 |
| Ethane | 343 | 403 | 200. |
| Propane | 99 | 199 | 315 |
| Butanes | 41 | 94 | 309 |
| Pentanes | 9 | 22 | 126 |
| Hexanes | 5 | 8 | 55 |
| Heptanes plus | 3 | 0 | 20 |
|  | 1341 | 951 | 1040 |

This method of handling results in the 3360 mols of 15# liquid which must still be rectified to remove ethane and propane, and the three different gas mixtures which must be treated either separately, or compressed to some common pressure and treated together by absorption. The combination of the three gases gives a gas containing only about 33% methane and therefore one that will develop much heat in an absorber, while less than half of it is available at 250 pounds pressure for such absorption step.

The present process delivers three commercially desirable fractions as liquids and only one gas. The three liquids shown are to be taken as an example, for by the known rectification used, components may be shifted from one fraction to the other, as known in the art.

The 6692 mols of raw condensate having the analysis given under the heading "800 pounds liquid," enters the desorber 1 through the pipe 5. Desorber 1 is operated at 800 pounds per square inch absolute and delivers 1354 mols of gas at its top at 800 pounds per square inch absolute containing the following:

| | Mols |
|---|---|
| Methane | 1081 |
| Ethane | 184 |
| Propane | 56 |
| Butanes | 22 |
| Pentanes | 7 |
| Hexanes | 3 |
| Heptanes plus | 1 |
| | 1354 |

The desorber 2 is operated at 250 pounds per square inch absolute and at a temperature of 160° F. at its base which gives good compressor operation on this particular condensate. The fractionator 3 is operated at 160 pounds per square inch absolute and at bottom temperature of 300° F. A stabilized distillate, 3457 mols, withdrawn from its base comprises the following:

| | Mols |
|---|---|
| Butanes | 450 |
| Pentanes | 484 |
| Hexanes | 553 |
| Heptanes plus | 1970 |
| | 3457 |

The fractionator 4 is operated at 525 pounds per square inch absolute and 350° F. From its base is withdrawn 437 mols natural gasoline comprising:

| | Mols |
|---|---|
| Butanes | 287 |
| Pentanes | 111 |
| Hexanes | 39 |
| Heptanes | --- |
| | 437 |

From the product accumulator 1444 mols of polymerization feed stock are withdrawn.

| | Mols |
|---|---|
| Ethane | 781 |
| Propane | 663 |
| | 1444 |

The gas resulting from the method of the present invention in this example is only 41% as great in volume as the sum of the three gases by the stage separation, contains substantially 80% methane and is all available at 800 pounds per square inch absolute, a most favorable condition for use of absorption. The first two liquids contain nothing lighter than butane and all ethane and propane are delivered together in one liquid.

Although the fractionation system used is known in the art, it would be inoperative on a liquid condensate of the example, and under many different conditions broadly similar, where the liquid to be rectified contains large amounts of dissolved methane. This is especially true where the liquid also contains a large percentage of heptanes and heavier (heptanes plus) such as the condensate of the present example which contains nearly 30 mol per cent of heptanes and heavier. If the raw condensate of the example were fed directly to the fractionator 3 without removal of methane by the desorbers 1 and 2, it would be impractical to condense reflux in water cooled condensers to reflux the fractionating columns even at high pressures. If the methane in the condensate were present in much lower concentration than in the present example so that reflux might be condensed in the condenser 16 at 500 pounds per square inch absolute, for example, the high percentage of heavy components in the base of the fractionator would require a higher temperature to boil it than is usually available from steam used at such plants. Though in principle, it is known that the condensate of the present example could be rectified by refrigerating the condensers 16 and 26 to some very low temperature, while heating the base of the fractionator 3 to the necessary high temperature, the separation may be accomplished with the present invention by use of ordinary atmospheric cooling water in the condensers and the usual 200 pounds per square inch absolute saturated steam in the heating elements.

With the removal of methane in the desorbers, the fractionator 3 is operated in known manner to remove the second impediment to complete rectification, namely the heavy components that require high kettle temperatures in high pressure columns. The pressure of 160 pounds per square inch absolute is suitable for the liquid of the example. It is high enough to permit condensation of part of the overhead as a reflux with a reasonable kettle temperature. Since the distillate withdrawn from the base of the fractionator 3 will usually be made to a vapor pressure specification, the temperature at its base may be controlled by a thermostat.

Though I prefer to control the heating of the base of the fractionator 4 by supplying a constant heat input in amount large enough to vaporize the overhead product plus the necessary reflux, and thus permit the temperature at the base of the fractionator to vary with variations in the composition of the propane free bottom product, the heating may be controlled by use of a thermostat to maintain a fixed temperature there. The result of maintaining a fixed temperature, as is done by most operators, will be to retain some propane in the bottoms or alternatively to send some butane into the top product as the feed composition varies. Variations in the composition of the gas from the top of the product accumulator 27, caused by control of the fractionator 4 by a thermostat, will not interfere with removal of methane in the second desorber.

Having thus described my invention, I claim:

1. The process of treating high pressure well distillates comprising contacting the same with a desorbing vapor in a desorption zone to remove essentially only methane from the distillate and retaining the other volatile materials heavier than methane in the so treated well distillate, fractionating the liquid effluent of the desorption zone to obtain a stabilized well distillate and a vaporous overhead, fractionating the vaporous overhead to obtain natural gasoline and a second vaporous overhead, cooling the second vaporous overhead to obtain as a condensate a polymerization feed stock, and passing the uncondensed vapor back to the methane desorption zone as a desorbing vapor.

2. The process of treating high pressure well distillates comprising contacting the same with a desorbing vapor in a desorption zone to remove essentially only methane from the distillate and retaining the other volatile materials heavier than methane in the so treated well distillate, fractionating the liquid effluent of the desorption zone to obtain a stabilized well distillate and a vaporous overhead, fractionating the vaporous overhead to obtain natural gasoline and a second vaporous overhead, cooling the second vaporous overhead to obtain a condensate and an uncondensed vapor, and passing the uncondensed vapor back to the desorption zone as the desorbing vapor.

3. The process of treating high pressure well distillates comprising contacting the same with a desorbing vapor in a desorption zone to remove essentially only methane from the distillate and retaining the other volatile materials heavier than methane in the so treated well distillate, fractionating the liquid effluent of the desorption zone to obtain a stabilized well distillate and a vaporous overhead, fractionating the vaporous overhead to obtain natural gasoline and a second vaporous overhead, cooling the second vaporous overhead to obtain a condensate and an uncondensed vapor, and passing a controlled quantity of the uncondensed vapor back to the desorption zone as the desorbing vapor, the quantity returned being altered in response to an increase in vapor pressure of the condensate over a predetermined value.

4. The process of treating high pressure well distillates comprising passing the high pressure well distillate through a first desorption zone, contacting the said well distillate in the first desorption zone with a first desorbing vapor to remove essentially only methane from the distillate, cooling the liquid effluent of the first desorption zone, passing the said cooled liquid effluent to a second desorption zone maintained at a lower pressure than the first desorption zone, contacting the liquid in the second desorption zone with a second desorbing vapor, passing the vaporous effluent of the second desorption zone to the first desorption zone as said first desorbing vapor, fractionating the liquid effluent of the second desorption zone to obtain a stabilized well distillate and a vaporous overhead, fractionating the vaporous overhead to obtain natural gasoline and a second vaporous overhead, cooling the second vaporous overhead to obtain a condensate and an uncondensed fraction, and returning the uncondensed fraction to the second desorption zone as said second desorption vapor.

5. The process of treating high pressure well distillates comprising passing the high pressure well distillate through a first desorption zone maintained at a pressure substantially equal to the total vapor pressure of the well distillate, contacting the high pressure well distillate in the first desorption zone with a first desorbing vapor to remove essentially only methane from the distillate, cooling the liquid effluent of the first desorption zone, passing the cooled liquid effluent of the first desorption zone to a second desorption zone maintained at a pressure equal to the vapor pressure of the well distillate in the bottom of the second desorption zone, supplying heat to the bottom of the second desorption zone, contacting the liquid in the second desorption zone with a second desorbing vapor, compressing the vaporous effluent of the second desorption zone, and passing this compressed vapor without cooling to the first desorption zone as said first desorbing vapor, subjecting the liquid effluent of the second desorption zone to vaporizing conditions, treating the evolved vapor by fractionation to obtain natural gasoline and a second vaporous overhead, cooling the second vaporous overhead to obtain a condensate and an uncondensed fraction, and returning the uncondensed fraction to the second desorption zone as said second desorption vapor.

6. The process of treating high pressure well distillates comprising passing the high pressure well distillate through a first desorption zone maintained at a pressure substantially equal to the total vapor pressure of the well distillate, contacting the high pressure well distillate in the first desorption zone with a first desorbing vapor to remove essentially only methane from the said well distillate, cooling the liquid effluent of the first desorption zone, passing the cooled liquid effluent of the first desorption zone to a second desorption zone maintained at a pressure equal to the vapor pressure of the well distillate in the bottom of the said second desorption zone, and supplying heat to the bottom of the second desorption zone, contacting the liquid in the second desorption zone with a second desorbing vapor, compressing the vaporous effluent of the second desorption zone and passing this compressed vapor without cooling into the first desorption zone as said first desorbing vapor, subjecting the liquid effluent of the second desorption zone to vaporizing conditions, treating the evolved vapor by fractionation to obtain natural gasoline and a second vaporous overhead, cooling the second vaporous overhead to obtain a condensate and an uncondensed fraction, returning the uncondensed fraction to the second desorption zone as the said second desorption vapor, controlling the amount of uncondensed fraction returned to the second desorption zone in such a manner that the same is increased when the amount of uncondensed fraction increases beyond a predetermined value, and controlling the heat supplied to the second desorption zone in accordance with the composition of the liquid effluent of the first desorption zone.

SAMUEL C. CARNEY.